United States Patent [19]
Mita et al.

[11] 4,084,181
[45] Apr. 11, 1978

[54] APPARATUS FOR TRANSMISSION OF CHROMINANCE SIGNALS DURING BLANKING PERIOD

[75] Inventors: Seiichi Mita; Hiroshi Kuroda, both of Hachioji; Hisashi Nakamura, Tokyo, all of Japan

[73] Assignee: Hitachi, Ltd., Japan

[21] Appl. No.: 761,120

[22] Filed: Jan. 21, 1977

[30] Foreign Application Priority Data

Jan. 21, 1976 Japan .................................. 51-4940

[51] Int. Cl.² .......................... H04N 9/32; H04N 7/08
[52] U.S. Cl. .......................................... 358/12; 358/4
[58] Field of Search .................................. 358/4, 12

[56] References Cited

U.S. PATENT DOCUMENTS

3,781,463  12/1973  Bussche ............................... 358/12

*Primary Examiner*—Robert L. Richardson
*Attorney, Agent, or Firm*—Craig & Antonelli

[57] ABSTRACT

A color television signal processing apparatus is provided for reproducing a chrominance signal from a color television signal transmitted or recorded in such a manner that the chrominance signal is compressed in time scale and that the compressed chrominance signal is superposed on the horizontal blanking period signal of the color television signal in a time division manner. This apparatus includes a circuit for generating a clock pulse used for expanding the time scale of the compressed chrominance signal comprising a signal generator driven by a sample pulse derived from a reference signal in a color television signal and producing low and high frequency signals, a reset pulse generating circuit which compares a reference reset pulse derived from the reference signal with a comparison reset pulse generated from selfoscillating circuit, and a clock pulse generator driven by the output signals of the signal generator and the reset pulse generator. In this way, a correct clock pulse which may be used for expanding the compressed chrominance signal is obtained even when the reference signal in the color television signal temporarily disappears.

6 Claims, 7 Drawing Figures

APPARATUS FOR TRANSMISSION OF CHROMINANCE SIGNALS DURING BLANKING PERIOD

BACKGROUND OF THE INVENTION

1. Field of the Invention

This invention relates to a color television signal processing circuit, and, more particularly, to a clock signal reproducing circuit apparatus using for expanding the time scale of a compressed chrominance signal when a color television signal is reproduced from the color television signal, transmitted or recorded in such manner that the chrominance signal is compressed in time scale and is inserted in a time division manner during the horizontal blanking period of the luminance signal.

2. Description of the Prior Art

In a NTSC system, a color television signal is composed of a luminance signal and a chrominance signal separated by frequency division and amplitude modulated by a subcarrier of 3.58 MHz. In such a system, a cross color disturbance or a dot disturbance is often generaed due to mixing of the luminance signal with the chrominance signal during the time these signals are reproduced. Further, in the case where a color television signal is recorded on a recording medium by frequency modulation, moire patterns are liable to be generated on a reproduced image since the luminance signal is superimposed on a high frequency part of the chrominance signal and the modulation index is high when the instant frequency of the frequency modulation is close to the frequency of the chrominance signal.

In view of this problem a new color television signal processing system has been proposed which makes no use of the chrominance subcarrier and is free from the disadvantages described above. In this new signal processing system, two kinds of chrominance signals, such as the chrominance difference signals (R - Y) and (B - Y), are alternatively selected for each line, the time scale thereof is compressed and the signals are superposed on the luminance signal in such a manner that the compressed signal is located in the horizontal blanking period. When the transmitted or recorded signal is reproduced, the compressed chrominance signal is expanded in time scale and converted into a line sequential chrominance signal.

Furthermore, in the new system a delay line is provided for delaying one horizontal scanning time, and the shortage lines of each chrominance signal are complemented in order to obtain two kinds of original chrominance difference signals. Finally, an approximated NTSC signal is reproduced from the two kinds of chrominance signals and a luminance signal is obtained by conventional techniques.

In the above new signal processing system, the time compression and expansion technique is carried out as follows. The chrominance signal is sequentially sampled by a low frequency clock signal and applied to an analogue memory device, such as a charge transfer device or a capacitor memory. The sampled signals stored in the analogue memory are read out by a high frequency clock signal. Consequently, the output signal of the analogue memory becomes a time compressed chrominance signal.

The time expansion is carried out in a manner opposite to of the time compression, that is, the time compressed signal is sampled and applied to a charge transfer element by a high frequency clock signal, and when the sampled signals stored in the charge transfer element are read out by a low frequency clock signal, a time expanded signal is obtained.

Now, in the course of time compression and expansion, if there is a time shift between the time to be sampled in the time compression and the time a the high frequency clock signal in the time expansion, the time expanded chrominance signal will have an aberation based on the product of the time compression ratio with the time shift.

As a result, a time shift is created between the luminance signal and the chrominance signal.

In order to eliminate the above defect, a reference signal, such as a sinusoidal signal, is inserted in the horizontal synchronizing signal period before the time compressed chrominance signal, and the clock signal used for time expansion is produced in synchronism with the reference signal. Accordingly, even if the time divisional signal is affected by jitter in a recording and reproducing system, the time fluctuation of the time compressed chrominance signal is equal to that of the reference signal.

Therefore, the fluctuations of the luminance signal and the chrominance signal expanded by a clock signal derived from the reference signal are equal. Accordingly, the time shift between the above two signals is avoided.

However, if the reference signal should disappear due to a drop out in the recording medium or pulsating noise on the transmission line, and if the reset pulse should disappear or be generated at an incorrect time position depending on the above disappearance of the reference signal, the clock pulse signal used for time expansion cannot be obtained, or will be generated at a shifted time position.

This is a serious problem which limits the performance efficiency of the proposed color television signal processing system.

SUMMARY OF THE INVENTION

The main object of this invention is to provide a improved color signal processing apparatus which is designed to expand the time scale of the compressed chrominance signal in a color television signal.

Another object of this invention is to provide a circuit for producing a correct clock pulse signal which may be used for time expansion of the compressed chrominance signal even when drop-out in the recording medium or pulsating noise in the transmission system occur.

To achieve the above objects, in accordance with this invention, a color television signal processing circuit is provided for producing a clock signal to be used for expanding the time scale of a compressed chrominance signal ("expansion clock signal") by use of a reference signal inserted in a part of a color television signal. This cirucit is composed of a signal generator for producing two kinds of signals, that is, a high frequency and a low frequency signal, by use of the reference signal, a first pulse generating circuit producing a reference reset pulse derived from the reference signal and synchronized with the output signal of the signal generator a second pulse generating circuit producing a comparison reset pulse generated by an oscillator driven by the output signal of the signal generator, a comparator for comparing the reference reset pulse with the comparison reset pulse, and a clock pulse generator for producing an expansion clock pulse by use of the output signals of the comparator and the signal generator.

In the circuit in accordance with this invention, since the second pulse generating circuit produces correct reset pulses during several frame periods when one correct activate signal is once added to the circuit, the comparator can generate a correct reset pulse even if the reference signal in the color television signal has disappeared. Therefore, the clock pulse generator can produce correct expansion clock pulses at all times.

The above-mentioned and other features and objects of this invention will become more apparent by reference to the following description taken in conjunction with the accompanying drawings.

DESCRIPTION OF THE PREFERRED EMBODIMENT

Before a description of various embodiments in accordance with this invention is provided, the principle of the time compression and expansion of a chrominance signal will be explained for the sake of better understanding of this invention.

Figure 1:
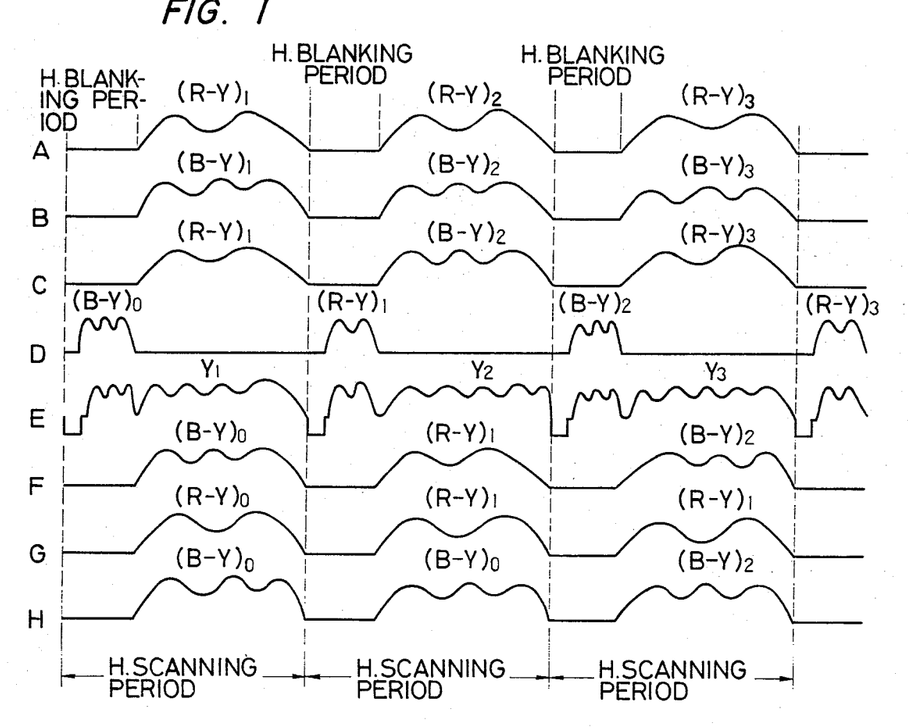
FIGS. 1 and 2 are waveform diagrams for explaining the time compression and time expansion of a chrominance signal in a color television signal.

In FIG. 1, waveforms A and B represent color difference signals (R - Y) and (B - Y), respectively, where R, B, and Y designate a red signal, a blue signal and a luminance signal, respectively. These signals are selected alternatively for each horizontal scanning period or frame and are converted into a line sequential chrominance difference signal, as shown at C.

The signal C is compressed in time scale as shown at D, and further, is superposed on a luminance signal time divisionally, as shown at E.

During the signal reproducing time, the compressed chrominance signal is separated from the luminance signal and converted to a time sequential chrominance signal by the expansion of the time scale of the compressed chrominance signal, as shown at F. Thereafter, the two chrominance signals (R - Y) and (B - Y) are separated. Since the separated chrominance signals have empty frames having no signal at every other frame, the empty frames are supplemented the chrominance signal of the preceding frame through a delay circuit delaying the horizontal scanning period, as shown at G and H.

Figure 2:
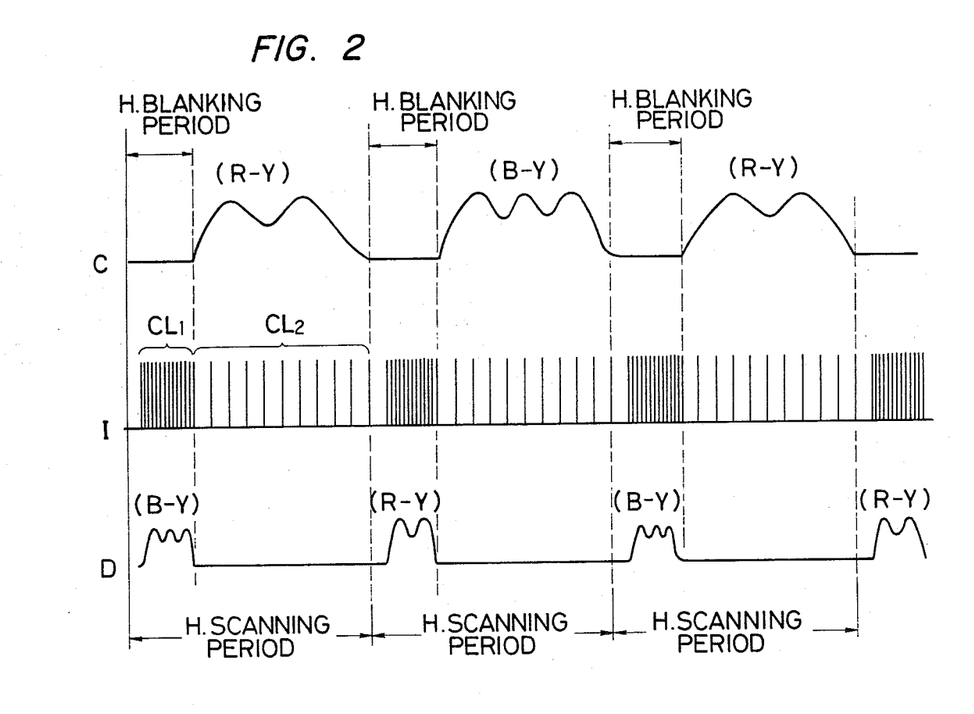

In the time compression, the chrominance signal C is sampled by a time compression clock pulse I, as shown in FIG. 2, and stored in an analogue memory, such as charge transfer device. The time compression clock pulse consists of a high frequency clock pulse $CL_1$ and a low frequency clock pulse $CL_2$ in a frame. The sample rates of clock pulses $CL_1$ and $CL_2$ are determined so that the frequency of the clock signal $CL_2$ is higher than twice the highest frequency of the chrominance signal, the ratio between the repetition periods of the clock pulses $CL_1$ and $CL_2$ being equal to the time compression rate. Further, the compressed chrominance signal may be located at a predetermined position of the horizontal blanking period, that is, the frequency of each of the clock pulses $CL_1$ and $CL_2$ is selected as an integral multiple of the horizontal scanning frequency $f_H$, for example, seven times.

When the chrominance signal C is added to a charge transfer device driven by the clock pulse I, the output signal of the device becomes a time compressed chrominance signal D, as shown in FIG. 2. The capacity or bits number K is determined as follows:

$$K = CL_2 \times V$$

where $V$ is the video signal period ($=52.1$ μs).

In the following description of various embodiments in accordance with this invention, the frequencies of the clock pulses $CL_1$ and $CL_2$ are selected to be 560 $f_H$ (approximately 8.2 MHz) and approximately 80$f_H$ (1.26 MHz), respectively. Accordingly, the bits number K will be approximately 64 for these examples.

Figure 3:
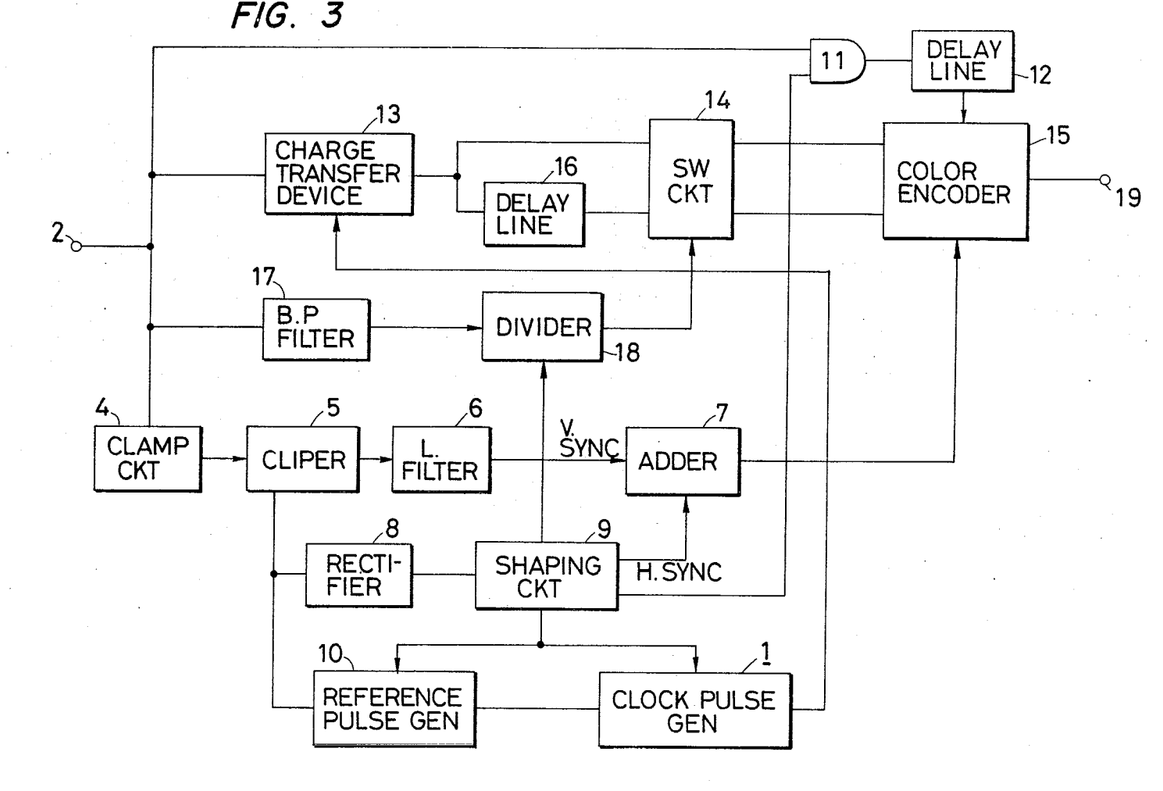
FIG. 3 is a block diagram of a color television signal processing circuit to which this invention is applied.

FIG. 3 is a block diagram of an embodiment of a color television signal processing system in accordance with this invention. In particular, the block 1 is an improved part according to this invention. A color television signal as shown at E in FIG. 1 is applied to an input terminal 2.

Figure 5:
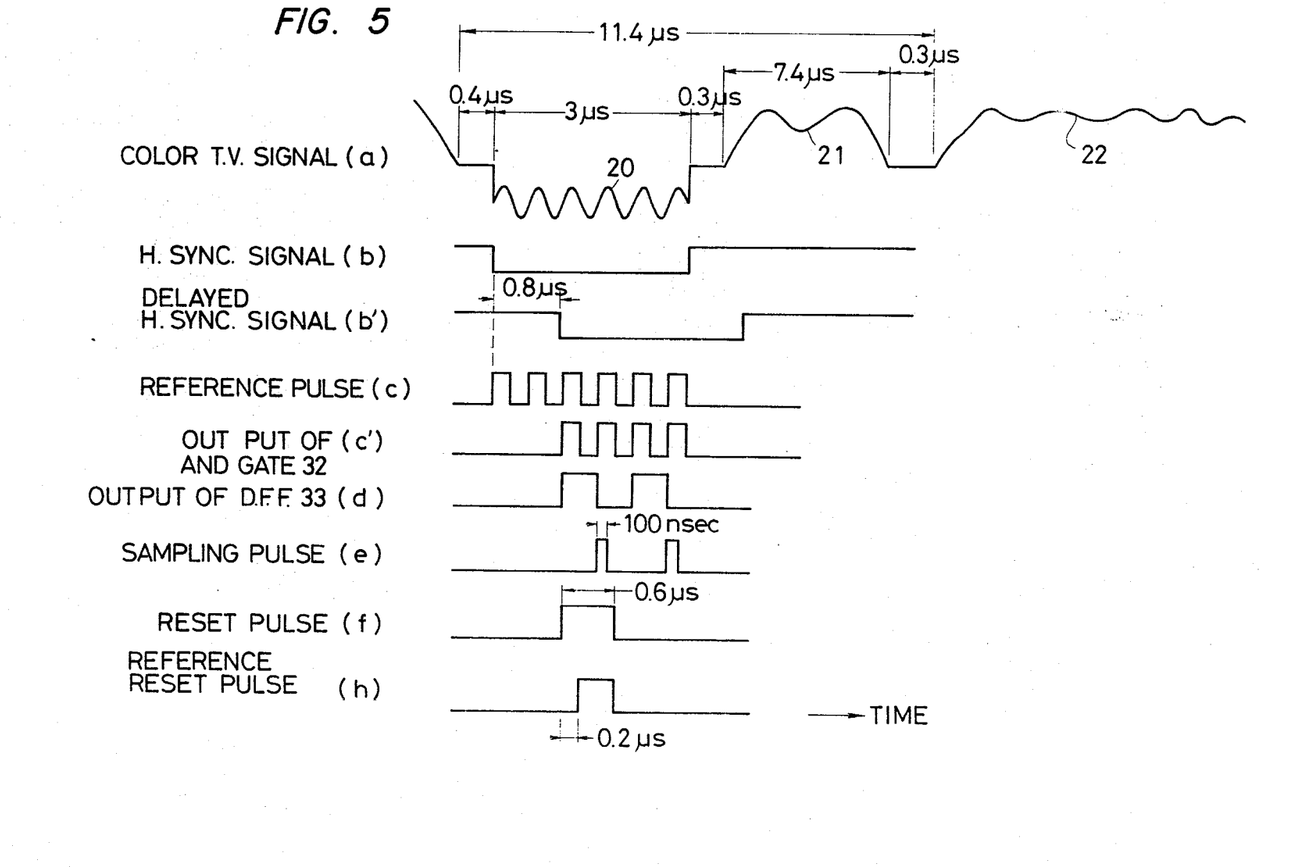
FIGS. 5, 6, and 7 are time charts for explaining the operation of the embodiment shown in FIG. 4.

FIG. 5 shows an enlarged waveform of the part of an input color television signal which occurs during the horizontal flyback blanking time and pulse waveforms used for generating a time expansion clock pulse.

As shown in the waveform (a) in FIG. 5, the horizontal blanking period of 11.4μs consists of the compressed chrominance signal 21 of 7.4μs, duration a horizontal synchronizing signal of 3μs and duration buffer periods of $0.4 + 0.3 + 0.3 = 1$μs so as to prevent cross talk between the chrominance and synchronizing signals. Further, about six cycles of a reference signal 20 having a frequency of $80 f_H \times Z$ is superposed on the horizontal synchronizing signal Back to FIG. 3, the input color television signal is clamped by a clamp circuit 4. A synchronizing signal applied through the clamp circuit 4 is converted to a vertical synchronizing signal by a clipper 5 and a low pass filter 6, and to a horizontal synchronizing signal by the clipper 5, a rectifier 8 and a wave shaping circuit 9. As these synchronizing signal separating circuits are well known, a detailed description thereof will be omitted. These synchronizing signals are added by an adder 7 and are applied to a color encoder 15.

A reference pulse generator 10 separates the reference signal 20 from the synchronizing signal and converts it to a reference pulse c as shown in FIG. 5. The reference pulse signal c and the horizontal synchronizing signal b are added to a time expansion clock pulse generator 1 the construction and operation of which will be explained in more detail in connection with FIGS. 4, 5, 6 and 7.

A charge transfer device 13 is driven by the output clock signal of the clock pulse generator 1, that is, a time expansion clock pulse I, and produces a expanded chrominance signal such as shown a F in FIG. 1.

The output signal of the charge transfer device 13 is applied to two lines, on one of which signal is added directly to a switch circuit 14, and other one the signal is added through a delay line 16 to the switch circuit 14. The delay line 16 provides a delay equal to one horizontal scanning period.

A band pass filter 17 derives a line sequential discrimination pulse during the vertical blanking period of from the color television signal. A frequency divider 18 counts down the horizontal synchronizing signal to one half as the reference of the line sequential discrimination signal, and the output of the divider 18 is applied to the switch circuit 14 in which the input chrominance signal is switched and converted into two kinds of chrominance signals G and H, as shown in FIG. 1.

The luminance signal is obtained at the output of a gate circuit 11 activated by a blanking signal from the wave shaping circuit 9. At this time, the output of the gate circuit 19 is delayed by a delay line 12 in order to control the phase relation between the luminance signal and the chrominance signal from the switch circuit 14, and the output of delay line 12 is applied to the color encoder 15.

Figure 4:
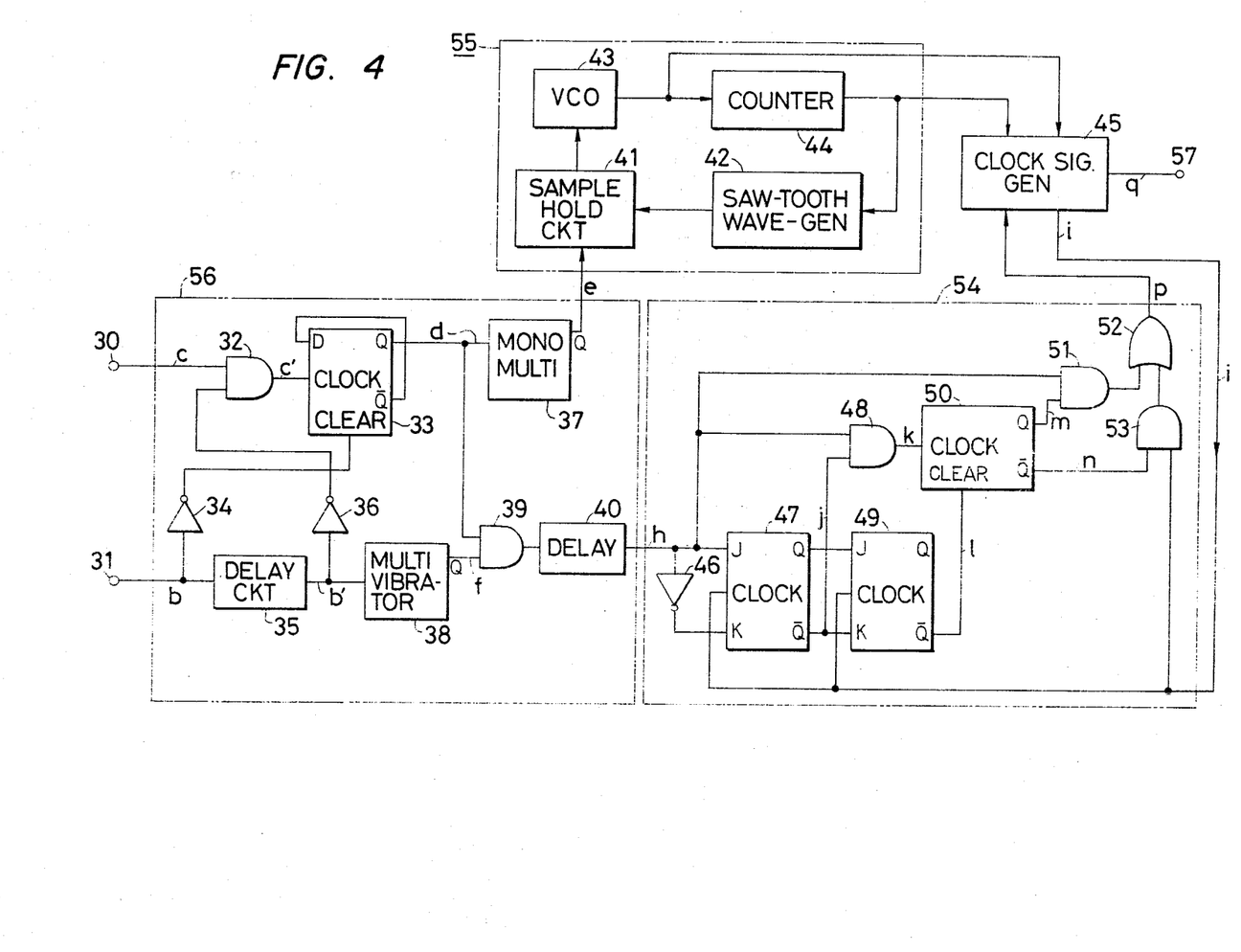
FIG. 4 is a block diagram of one embodiment of a color television signal processing circuit according to this invention.

In FIG. 4 which shows an exemplary embodiment of the time expansion clock pulse generator 1, the reference pulse $c$ consisting of six pulses having a frequency of $160 f_H$ is applied to an AND gate 32 through an input terminal 30. On the other hand, a horizontal synchronizing pulse $b$ having a pulse width of $3\mu s$ and a frequency of $f_H (= 15.75 kHz)$ is applied to a NOT gate 34 and a delay circuit 35 having delay time 0.8 $\mu s$ through a terminal 31. A NOT gate 36 connected to the output of delay circuit 35 is provided in order to eliminate the first two pulses in the reference pulse $c$ so that these two pulses will not be included in the reference pulse signal. This is done since the initial part of the reference pulse signal may have been subjected to a time fluctuation caused by a wave disturbance in the preceding part of the reference pulse when it is reproduced through a transmission system or a recording medium. On the other hand, the output signal of delay circuit 35 is applied to the AND gate 32 through a NOT gate 36. Accordingly, the output of the AND gate 32 shown at $c'$ in FIG. 5 is applied to a D type flip-flop circuit 33 producing a pulse $d$.

The synchronizing pulse of inverse polarity provided by the NOT gate 34 is applied to the D type flip-flop circuit 33 as a clear pulse setting the initial time position.

The reference pulse $d$ consisting of two cycles at a frequency $80 f_H$, is applied to a monostable multivibrator 37 which produces sampling pulses $e$ having a pulse width of 100 ns at the trailing edge of the pulse $d$.

The output signal $b'$ of the delay circuit 35, further, is applied to another monostable multivibrator 38, which produces a reset pulse $f$ having a pulse width of 0.6 $\mu s$ at the trailing edge of the delayed synchronizing signal $b'$, the pulse $f$ being applied to an AND gate 39 which operates in response to the output of flip-flop circuit 33.

The output signal of the AND gate 39 is delayed by 0.2 $\mu s$ through a delay circuit 40 so that the trailing edge of the sampling pulse $e$ may be always within the duration time of the delayed pulse $h$. This delayed pulse $h$ is used as a reference reset pulse.

The sampling pulse $e$ at the output of the monostable multivibrator 37 is applied to a sample hold circuit 41 which samples the output signal of a sawtooth wave generator 42 driven by a clock pulse used for expansion of the time scale. The hold circuit 41 serves to hold the sampled signal and controls the voltage control oscillator 43, which generates a clock pulse having a frequency $560 f_H$.

A counter 44 divides the frequency ($560 f_H$) of the output of the oscillator 43 and produces a clock pulse having a frequency of $80 f_H$. The voltage controlled oscillator 43, the counter 44, the saw tooth wave generator 42 and the sample hold circuit 41 form an automatic phase control circuit (APC). As the construction of the APC is well known in this field, the detail description thereof is omitted.

A clock signal generating circuit 45 produces a time expansion clock pulse similar to the time compression clock pulse I shown in FIG. 2 and a comparison reset pulse $i$ having a frequency $f_H$ by use of the clock pulses $560 f_H$ and $80 f_H$ from the voltage controlled oscillator 43 and the counter 44.

The comparison reset pulse is obtained by dividing the frequency of the clock pulse from the counter 44. A circuit 54 is a reset pulse judgment circuit or a phase comparator which compares the comparison reset pulse $i$ with the reference reset pulse $h$ from the delay circuit 40.

Figure 6:
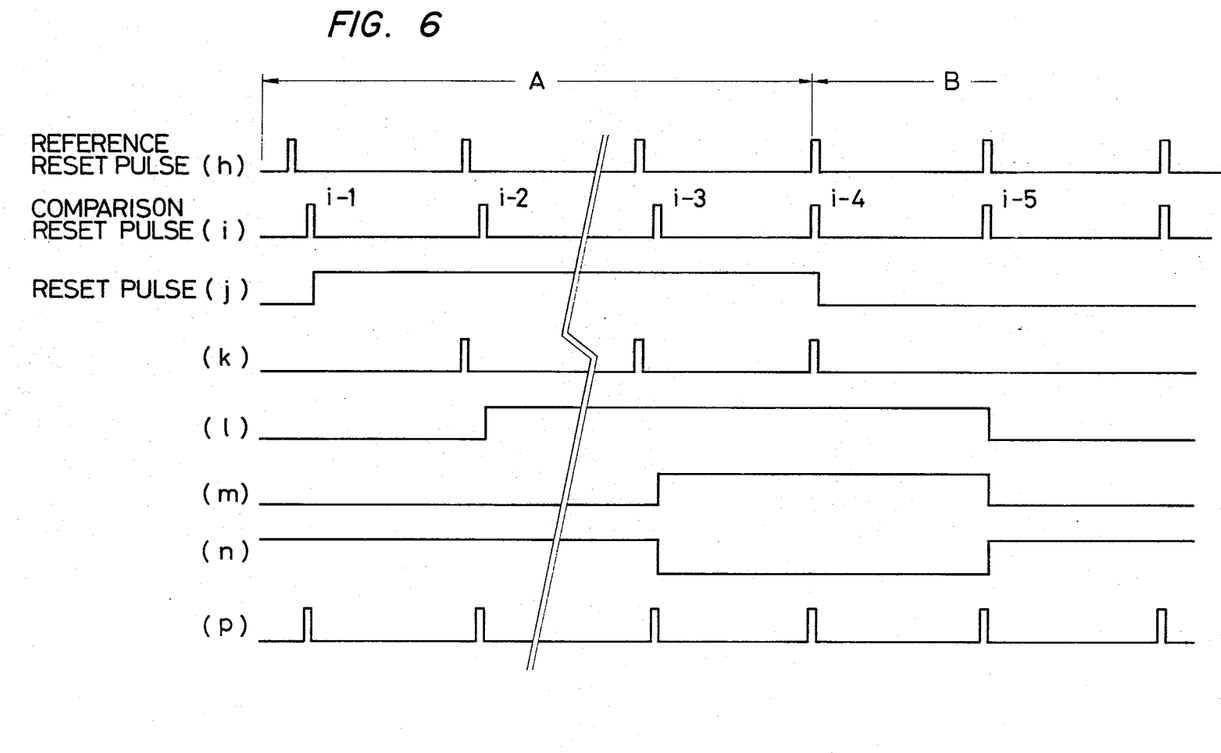

FIG. 6 shows the time chart representing the time relation of signals in each block in the judgment circuit 54.

This reset pulse judgment circuit 54 receives the reference reset pulse and produces $h$ a reset pulse $j$ prior to the comparison reset pulse $i$ when the reference and the comparison reset pulse are not coincided in phase over a predetermined frame interval $T_1$, for example, three frame periods shown as state A in FIG. 6.

On the other hand, the circuit 54 produces the comparison reset pulse $i$ as a pulse $i$ prior to the reference reset pulse $h$ during a state B when the reference and the comparison reset pulse are in phase over predetermined frame intervals $T_2$.

The intervals $T_1$ and $T_2$ are is determined in accordance with the frame period during which dropouts and pulsive noises might possibly occur in succession.

In more detail, the reference reset pulse $h$ is applied to the J terminal of a J - K flip-flop circuit 47, to the input of a NOT gate 46 and to respective inputs of AND gates 48 and 51, and the comparison reset pulse $i$ is applied to clock terminals of the J - K flip-flop circuits 47 and 49 as a clock pulse. The flip-flop circuits 47 and 49 are connected serially and form a two bit shift register.

Now, when the phases of the reference reset pulses $h$ and the comparison reset pulses $i$ are not coincident successively as shown in FIG. 6 (frame period A), the first comparison reset pulse $i$-1 produces an output voltage at terminal $\overline{Q}$ of the flip-flop circuit 47, as shown at $j$ in FIG. 6, opens the gate 48, and permits application of the reference reset pulse $h$ into a three bit shift register 50 as a clock signal $k$. Then, when the second comparison reset pulse $i$-2 is received, whose phase also is not coincident with that of the reference reset pulse, the output voltage $l$ is produced at the terminal $\overline{Q}$ of the flip-flop circuit 49 and the three shift register 50 is placed in condition to be activated by the clock signal $k$.

Further, when the phase of the third comparison reset pulse $i$-3 is not coincident with that of the reference reset pulse, the output voltage $m$ is produced at the terminal Q of the shift register 50 and the output voltage of the terminal $\overline{Q}$ thereof disappears. Accordingly, the AND gate 51 is opened and the AND gate 53 is closed. In that time, the reference reset pulse $h$ is applied to the clock signal generator 45 as a reset pulse through the activated AND gate 51 and OR gate 52.

In the state B where the phases of the reference and the comparison reset pulse are coincident, the voltage of the terminal $\overline{Q}$ of the flip-flop circuit 47 is not provided and the AND gate 48 is closed. Therefore, the reference signal is not supplied to the shift register 50 as a clock signal through the AND GATE 48. In this state, as the voltages m and n of the terminal $\bar{Q}$ and Q of the register 50 are maintained at preceding conditions, the reference reset signal is still outputted as a reset pulse p. In succession, when the phase of the comparison reset pulse i-5 is coincident with that of the reference reset pulse h, the voltage of the terminal $\bar{Q}$ of the flip-flop 49 is not produced and the contents of the shift register 50 are cleared. Accordingly, the comparison reset pulse i is derived as a reset pulse p through the OR gate 52 since the AND gate 51 is closed and the AND gate 53 is opened.

Figure 7:
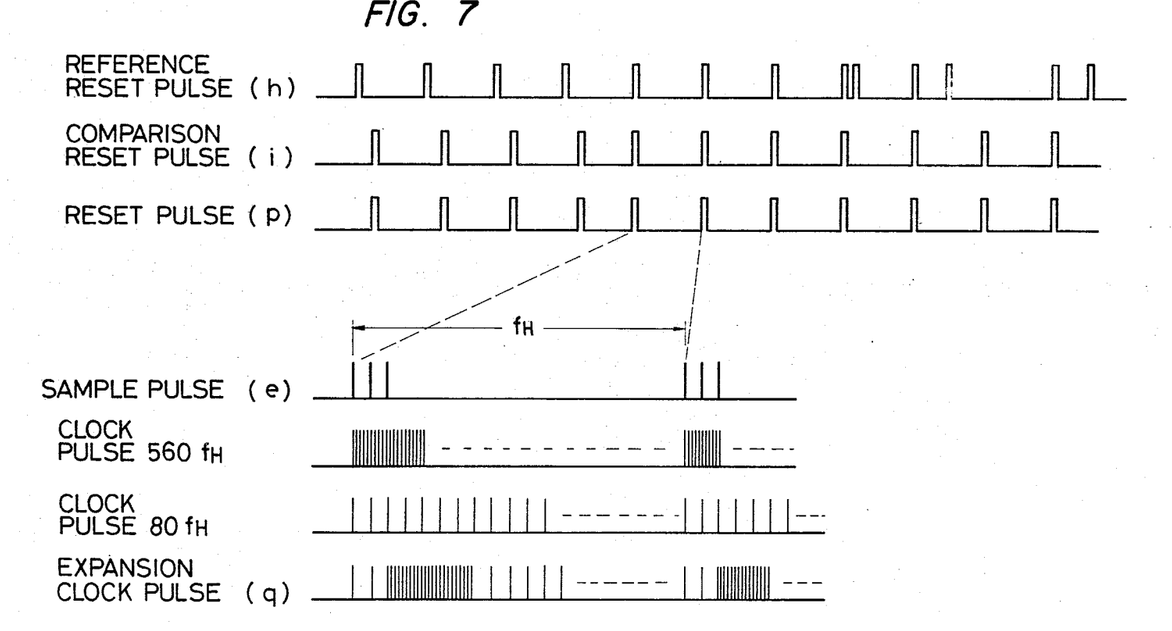

FIG. 7 shows the time chart representing the relationship between the reference reset pulse h, the comparison reset pulse i, the reset pulse p, the sample pulse l, the clock pulse 500 $f_H$, clock pulse 80 $f_H$ the and the expansion clock pulse p.

As described in connection with the above embodiment, when the reference signal 20 in FIG. 5 disappears or when the reference reset pulse h disappears or is generated at the wrong time position depending on the disappearance of the reference signal 20, the reset pulse judgment circuit detects the disappearance or wrong appearance of the reference reset pulse, and produces stably the time expansion clock pulse q at the correct time position corresponding to the compressed chrominance signal since the sample hold circuit 41 in the APC circuit continues to maintain the output voltage of the sawtooth wave generator 42 and can produce with stability the clock pulse from the oscillator 43 and the clock pulse from the counter 44 applied to the expansion clock pulse generator 45.

In the embodiment described above, the reset pulse judgment circuit 54 is so constructed that the comparison reset pulse i is outputted as a reset pulse p at the time when the reference reset pulse h is coincident with the comparison reset pulse i twice successively. This is depending on the fact that it is necessary to prevent the judgment circuit 45 from operating incorrectly in response to disappearance of the reset pulse by a check of the continuity of minimum occurrence of the comparison reset pulse, and reference reset pulse since drop out in the recording medium, such as video disk, is liable to occur successively.

What is claimed is:

1. A color television signal processing circuit for reproducing a chrominance signal from a color television signal in which the chrominance signal compressed in time scale is superposed on the horizontal flyback blanking time portion of the color television signal along with a reference signal superimposed on the horizontal synchronizing signal and synchronized with the clock signal used for compressing the chrominance signal, which comprises:

first circuit means responsive to said color television signal for producing a reference reset pulse and a sample pulse derived from said reference signal superimposed on said horizontal synchronizing signal;

second circuit means driven by said sample pulse for producing a high frequency pulse and a low frequency pulse synchronized with said reference reset pulse;

clock pulse generator means capable of being synchronized in response to an external signal for producing a time expansion clock pulse and a comparison reset pulse in response to the output of said second circuit means; and reset pulse judgment circuit means responsive to said reference reset pulse and said comparison reset pulse for producing said reference reset pulse as a reference pulse to synchronize said clock pulse generator means when the reference reset pulse and the comparison reset pulse are coincident in phase and for producing said comparison reset pulse as a reference pulse to synchronize said clock pulse generator means when the reference reset pulse and the comparison reset pulse are not coincident in phase.

2. A color television signal processing circuit according to claim 1, wherein said first circuit means comprises third circuit means for eliminating at least one pulse in the initial part of said reference signal, fourth circuit means for dividing the output of said third circuit means, fifth circuit means for producing sample pulses having a pulse width smaller than that of the output pulses of said fourth circuit means and at the trailing edge of the output pulses of the fourth circuit means, and sixth circuit means for producing reference reset pulses derived from the output pulses of said fourth circuit means and delayed a predetermined time.

3. A color television signal processing circuit according to claim 1, wherein said second circuit means comprises a voltage controlled oscillator producing a high frequency pulse, a frequency divider connected to the output of said oscillator and producing a low frequency pulse, a sawtooth wave generator driven by the output signal of said frequency divider, and sample hold circuit responsive to the sample pulse of said first circuit means for sampling the output signal of said sawtooth wave generator and providing its output signal to said voltage controlled oscillator.

4. A color television signal processing circuit according to claim 3, wherein the frequencies of said high and low frequency pulses are an integral multiple of the frequency of the horizontal synchronizing signal.

5. A color television signal processing circuit according to claim 4, wherein the frequency of said low frequency pulse is 80 $f_H$ (where $f_H$ is a frequency of horizontal synchronizing signal) and the frequency of a high frequency pulse is 560 $f_H$.

6. A color television signal processing circuit according to claim 1, wherein said reset pulse judgment circuit comprises comparison means including a two bit shift register receiving said reference reset pulse at the input thereof and said comparison reset pulse as a clock pulse for determining whether said reference reset pulse and said comparison reset pulse are coincident in phase for two successive pulses, and gating means responsive to the output of said comparison means for applying either said reference reset pulse or said comparison reset pulse to said clock pulse generator means.

* * * * *